(12) United States Patent
Chen

(10) Patent No.: US 7,911,204 B2
(45) Date of Patent: Mar. 22, 2011

(54) REEL SHAFT OF BARCODE PRINTER

(75) Inventor: Ching-Wen Chen, Taipei (TW)

(73) Assignee: TSC Auto ID Technology Co., Ltd., I-Lan Hsien (TW)

( * ) Notice: Subject to any disclaimer, the term of this patent is extended or adjusted under 35 U.S.C. 154(b) by 262 days.

(21) Appl. No.: 12/318,709

(22) Filed: Jan. 7, 2009

(65) Prior Publication Data

US 2009/0174398 A1 Jul. 9, 2009

(30) Foreign Application Priority Data

Jan. 7, 2008 (TW) .............................. 97200331 U

(51) Int. Cl.
*G01B 7/30* (2006.01)
*G01B 7/315* (2006.01)

(52) U.S. Cl. .............. 324/207.25; 324/160; 324/207.22; 33/1 PT

(58) Field of Classification Search ........... 324/207.11–207.25, 160–180; 33/1 PT See application file for complete search history.

(56) References Cited

U.S. PATENT DOCUMENTS

| 6,062,501 A * | 5/2000 | Halvarsson ................ 242/364.8 |
| RE39,843 E * | 9/2007 | Wineland ....................... 324/262 |
| 2007/0216403 A1* | 9/2007 | Asano ....................... 324/207.25 |

* cited by examiner

*Primary Examiner* — Ha Tran T Nguyen
*Assistant Examiner* — Emily Y Chan
(74) *Attorney, Agent, or Firm* — Rosenberg, Klein & Lee

(57) ABSTRACT

A reel shaft sensor is provided for a barcode printer and is applied to a reel shaft of the barcode printer. The reel shaft sensor device includes a plurality of magnetic elements and at least one magnetic sensor. The reel shaft has an end to which a connection member is mounted for coupling the interior of a housing of the barcode printer. The magnetic element is arranged inside the connection member and the magnetic sensor is installed inside the housing of the barcode printer and corresponding in position to the connection member. The magnetic sensor detects a magnetic signal from the magnetic elements that rotates with the reel shaft to determine the rotational speed and angular position of the reel shaft. The device is a small-size, magnetism operating shaft sensor.

9 Claims, 6 Drawing Sheets

REEL SHAFT OF BARCODE PRINTER

BACKGROUND OF THE INVENTION

1. Field of the Invention

The present invention relates to a reel shaft sensor device of a barcode printer, and in particular to a reel shaft sensor device applicable to a label printer and comprised of magnetic elements and a magnetic sensor for detecting the rotational status of a reel shaft of a barcode printer.

2. The Related Arts

A conventional barcode printer includes reel shafts for continuously supplying a carbon ribbon and a tape of labels. The conventional barcode printer does not include functions to monitor the rotation of the reel shafts thereof, and it often employs open-loop control to determine the rotational speed and status of the reel shafts. However, such a control arrangement may be affected by the inertia and mechanical frictions of the reel shaft itself to thereby induce error. For barcode printers that require precision of control and quality of the rotation of the reel shaft, such positional or angular error often leads to adverse influence for the industry.

If known photoelectric sensors are employed to detect the rotation status of a reel shaft, then it will encounter a problem of complication of installation. In addition, the photoelectric sensor element surfer light pollution problems. For example, when the photoelectric sensor element is arranged outside of the reel shaft, the results of detection might be influenced by natural lights. In addition, the size of the known photoelectric sensor makes it difficult to be installed inside the reel shaft. Installing the known photoelectric sensor inside the reel shaft may also affect the precision and quality of detection by the reel sensor for barcode printers.

SUMMARY OF THE INVENTION

Thus, in view of the above discussed problems, the present invention is aimed to provide a reel shaft sensor device for a barcode printer, which overcomes the drawbacks of the conventional bar code printer in the detection of the rotational status of a barcode printer reel shaft in relation to precision and quality of control.

To achieve the above objective, the present invention provides a reel shaft sensor for a barcode printer, which is applied to a reel shaft of the barcode printer. The reel shaft sensor device comprises a plurality of magnetic elements and at least one magnetic sensor. The reel shaft has an end to which a connection member is mounted for coupling the interior of a housing of the barcode printer. The magnetic element is arranged inside the connection member and the magnetic sensor is installed inside the housing of the barcode printer and corresponding in position to the connection member. The magnetic sensor detects a magnetic signal from the magnetic elements that rotates with the reel shaft to determine the rotational speed and angular position of the reel shaft. The device is a small-size, magnetism operating shaft sensor.

The reel shaft sensor device in accordance with the present invention has the effectiveness that the magnetic elements and magnetic sensor used in the present invention are of small sizes, which allows easy installation in the reel shafts for carbon ribbon and label roll to provide the reel shaft with closed-loop control for enhancing control precision and quality for the reel shafts. There is no need to take light pollution into consideration in employing the magnetic elements and the magnetic sensor to the reel shafts of barcode printers in accordance with the present invention.

BRIEF DESCRIPTION OF THE DRAWINGS

The present invention will be apparent to those skilled in the art by reading the following description of a preferred embodiment thereof, with reference to the attached drawings, wherein.

DETAILED DESCRIPTION OF THE PREFERRED EMBODIMENT

Figure 1:
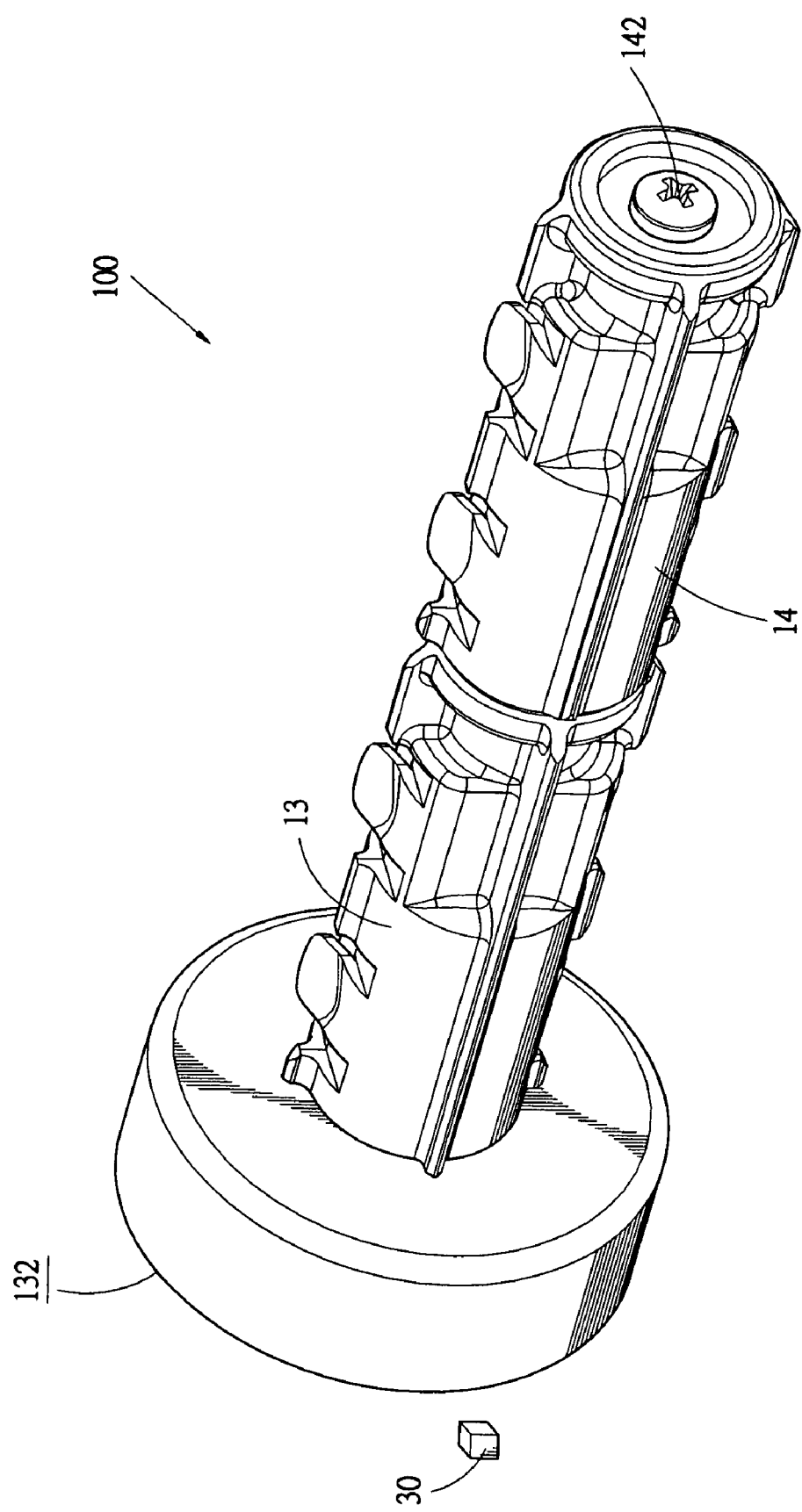
FIG. 1 is a perspective view of a reel shaft of a barcode printer in which a reel shaft sensor device constructed in accordance with the present invention is embodied.
Figure 2:
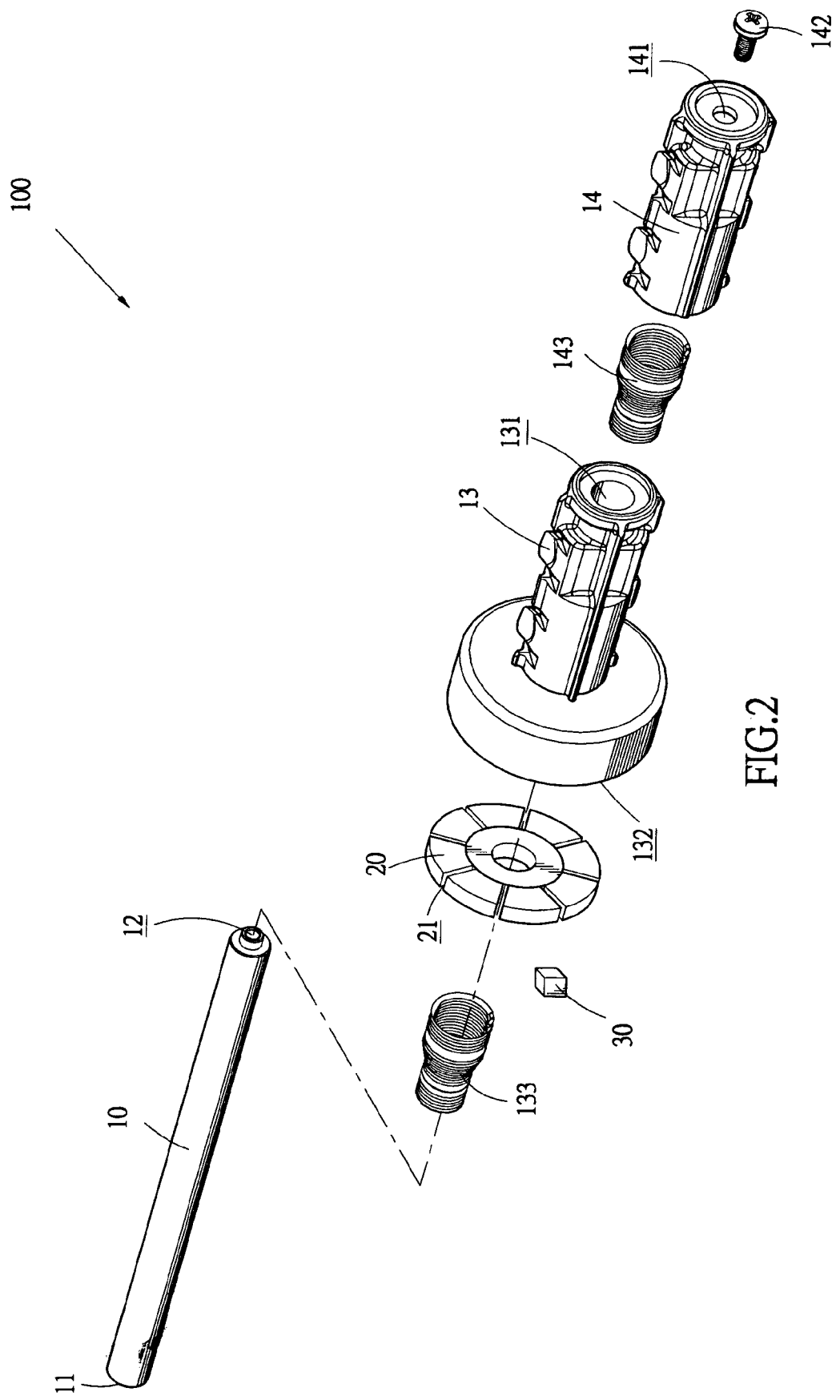
FIG. 2 is an exploded view of the reel shaft sensor device in accordance with the present invention.
Figure 3:
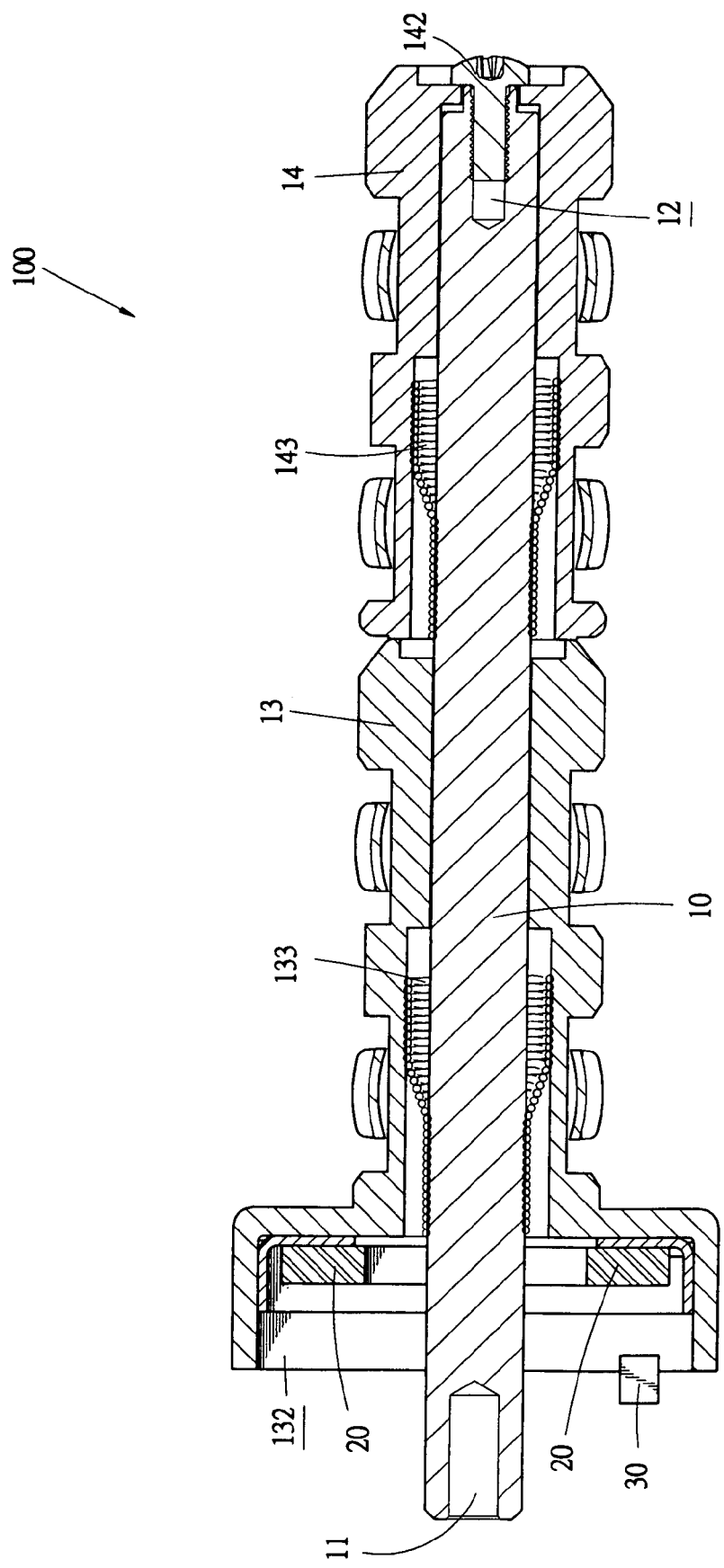
FIG. 3 is a cross-sectional view of the reel shaft sensor device in accordance with the present invention.
Figure 4:
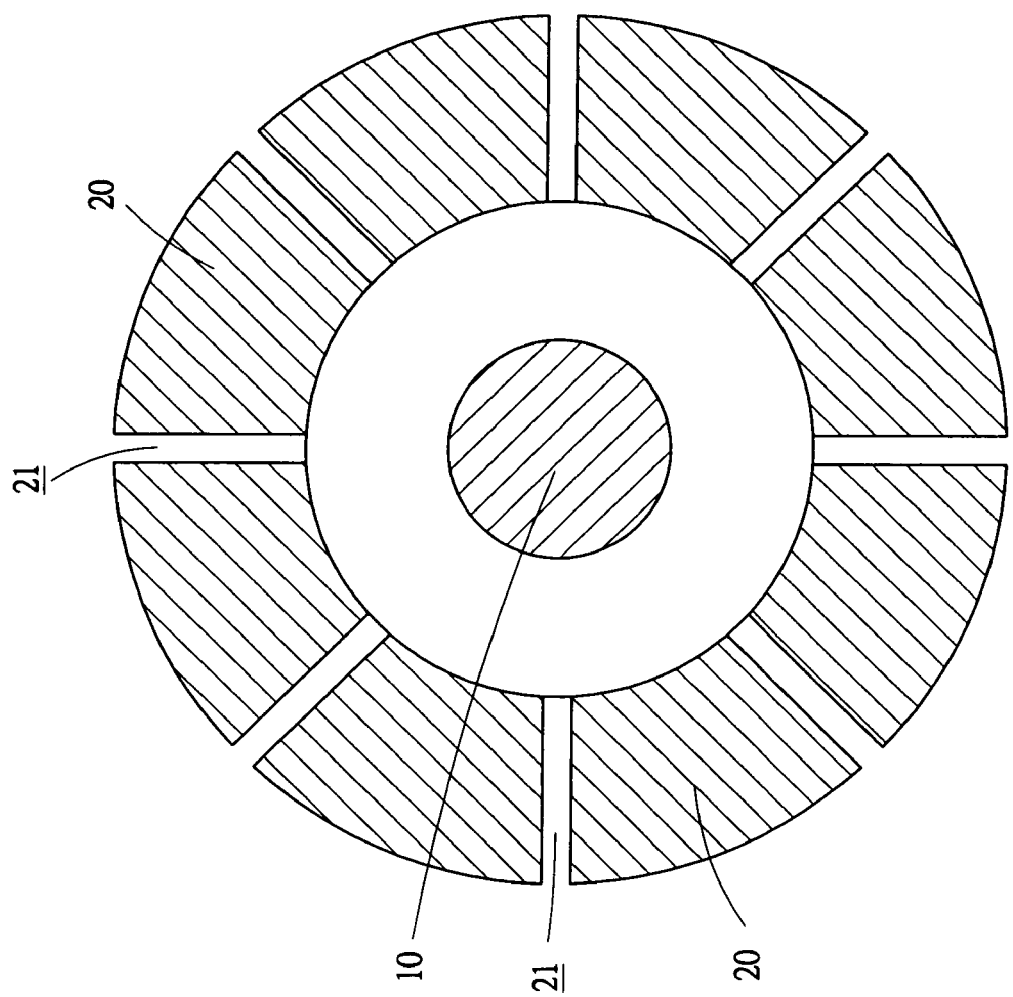
FIG. 4 is a partial cross-sectional view of the reel shaft sensor device of the present invention, illustrating the spatial relationship between magnetic elements and a reel shaft of the barcode printer.
Figure 5:
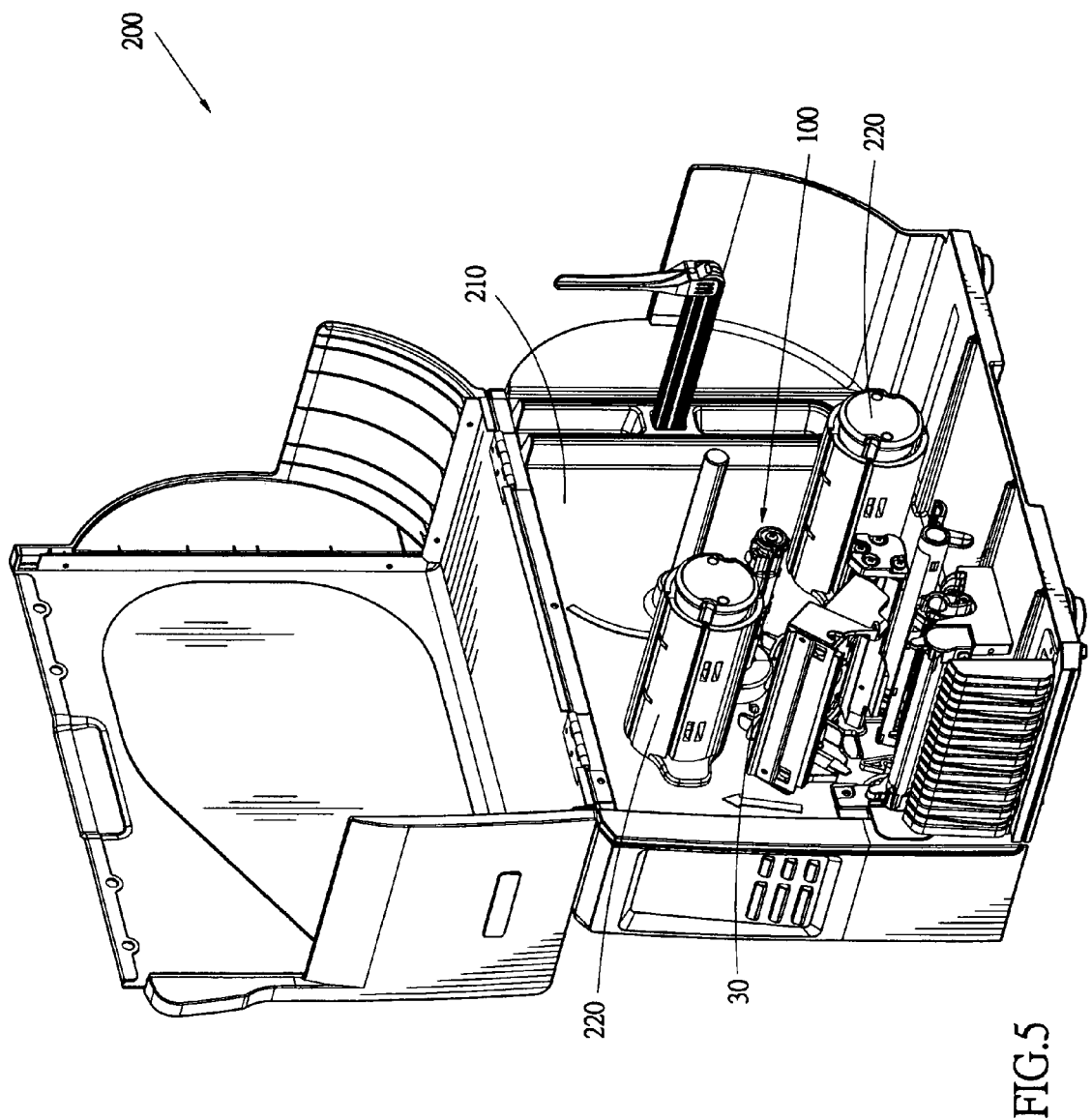
FIG. 5 is a perspective view illustrating an application of the reel shaft sensor device in accordance with the present invention in a barcode printer, which is shown in an open condition.
Figure 6:
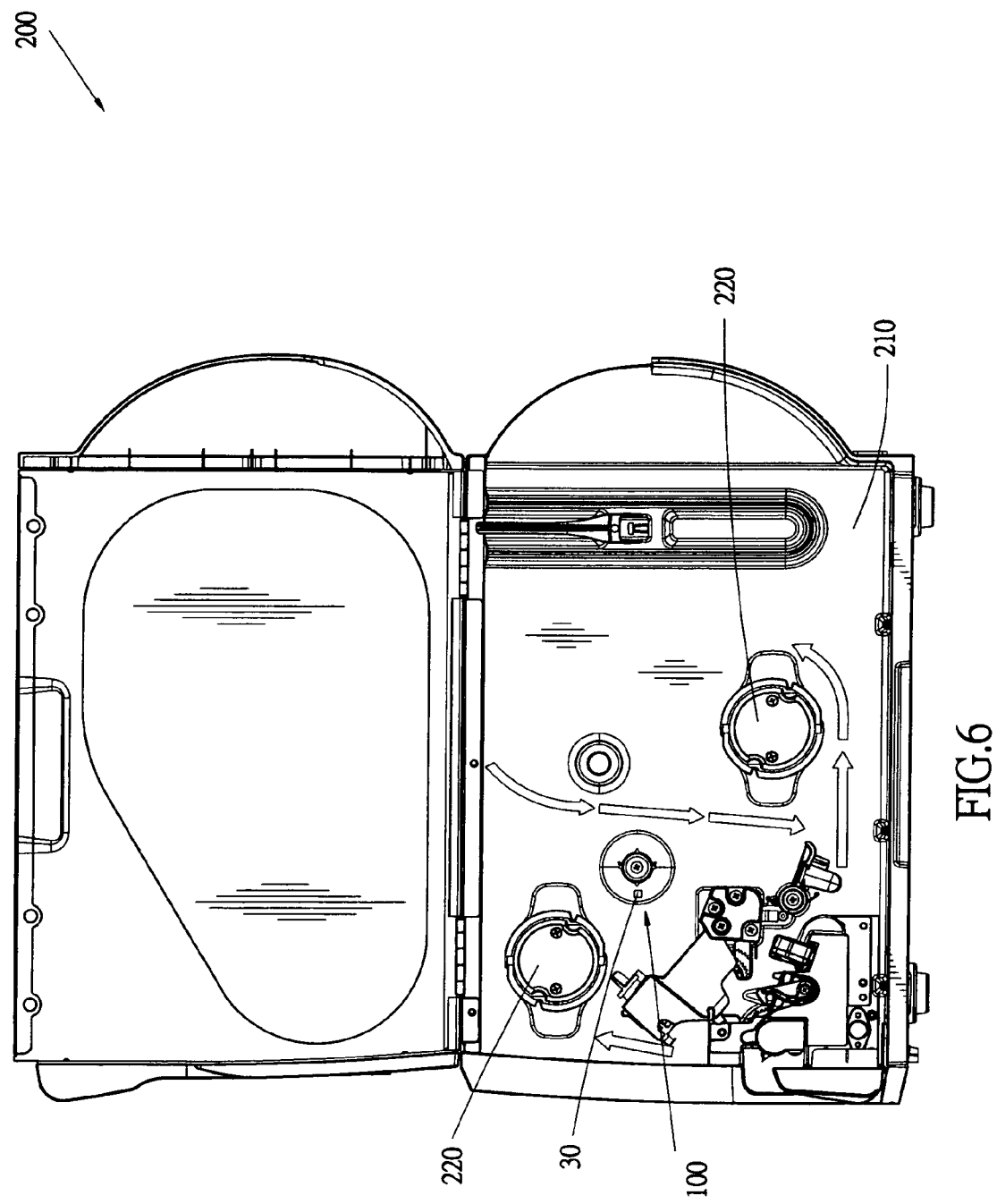
FIG. 6 is an elevational view of FIG. 5.

With reference to the drawings and in particular to FIGS. 1-4, a reel shaft sensor device constructed in accordance with the present invention, generally designated at 100, is provided for a barcode printer 200 (FIGS. 5 and 6). The reel shaft sensor device 100 is applicable to a reel shaft 10, which can be of any type and is not limited to any specific type. In an embodiment of the present invention, the reel shaft 10 serves as a carbon ribbon reel shaft contained in the bar code printer 200. Other reel shafts used in the barcode printer 200, such as a barcode label roll shaft, are also within the scope of the present invention.

The reel shaft 10 has an end forming a base 11, which is coupled to an interior of a housing 210 of the barcode printer 200 (see FIG. 6). An internally-threaded screw hole 12 is defined in an opposite end of the reel 10.

At least one connection member 13 forms therein a bore 131 that is fit over the base 11 of the reel shaft 10 to secure the connection member 13 to one end of the reel shaft 10 and to partly shield the interior of the housing 210 of the barcode printer 200. A compartment 132 is formed inside the connection member. A first elastic element 133 is arranged inside the connection member 13 and positioned between the connection member and the reel shaft 10, allowing the connection member 13 to rotate around the reel shaft 10 in a resilient manner.

At least one rotation member 14 forms therein a bore 141, which is fit over the opposite end of the reel shaft 10. The bore 141 is axially and substantially aligned with the screw hole 12, allowing the rotation member 14 to be attached to the reel shaft 10 by a bolt 142 extending through the bore 141 and engaging the screw hole 12. A second elastic element 143 is arranged inside the rotation member 141 and is positioned between the rotation member 141 and the reel shaft 10, allowing the rotation member 14 to rotate around the reel shaft 10 in a resilient manner.

A plurality of magnetic elements 20 is attached to an inside surface of the compartment 132 of the connection member 13 of the reel shaft 10 (as shown in FIG. 4). A fixed gap 21 is formed between adjacent magnetic elements 20. The magnetic elements 20 are not limited to any specific type, and magnets are used in the embodiment illustrated. Other magnetic elements with similar functions are also within the scope of the present invention.

At least one magnetic sensor 30 is arranged in the interior of the housing 210 of the barcode printer 200 to correspond to the magnetic elements 20 inside the connection member 13 of the reel shaft 10. In the rotation of the connection member 13 with the reel shaft 10, magnetic induction occurs in the magnetic sensor 30 due to the variation of magnetic flux between the magnetic elements 20 and the magnetic sensor 30, whereby the magnetic sensor 30 detects the rotation movements of the connection member 13 and generates a rotation signal that is fed back to a control circuit of the barcode printer 200 to use as basis for detecting the status of and controlling the reel shaft 10. The magnetic element 30 is not limited to any specific type and a Hall IC is an example implemented in the embodiment illustrated. Other magnetic sensors with similar functions are also within the scope of the present invention.

Also referring to FIGS. 5 and 6, an application of the reel shaft sensor device 100 in a barcode printer is shown for mounting a carbon ribbon. The carbon ribbon is wound around the reel shaft 10. With the arrangement of the magnetic elements 20 and the magnetic sensor 30, the rotation motion of the reel shaft 10 can be detected accurately and out fed to serve as basis for the barcode printer 200 to detect and control the status of the reel shaft 10. In addition, the barcode printer 200 may also comprise an additional reel shaft 220 around which a barcode label tape is wound and the reel shaft 220 of the barcode printer 200 can also implement the reel shaft sensor device 100 of the present invention to perform the same rotation sensing function.

Although the present invention has been described with reference to the preferred embodiment thereof, it is apparent to those skilled in the art that a variety of modifications and changes may be made without departing from the scope of the present invention which is intended to be defined by the appended claims.

What is claimed is:

1. A reel shaft sensor device for a barcode printer, comprising:
   a reel shaft having an end including a connection member for coupling to an interior of a housing of the bar code printer;
   a plurality of magnetic elements mounted inside the connection member of the reel shaft; and
   at least one magnetic sensor mounted inside the housing and corresponding in position to the connection member, the magnetic sensor corresponding to the magnetic elements to detect rotation motion of the reel shaft.

2. The reel shaft sensor device as claimed in claim 1, wherein the reel shaft has an end including a base.

3. The reel shaft sensor device as claimed in claim 1, wherein the reel shaft has an end forming a screw hole.

4. The reel shaft sensor device as claimed in claim 1, wherein the connection member forms therein a bore.

5. The reel shaft sensor device as claimed in claim 1, wherein the connection member forms therein a compartment.

6. The reel shaft sensor device as claimed in claim 1, wherein the reel shaft has an end coupled with a rotation member.

7. The reel shaft sensor device as claimed in claim 6, wherein the rotation member forming therein a bore.

8. The reel shaft sensor device as claimed in claim 6, wherein the magnetic elements comprise magnets.

9. The reel shaft sensor device as claimed in claim 1, wherein the magnetic sensor comprises a Hall IC.

\* \* \* \* \*